(12) United States Patent
Ikeno et al.

(10) Patent No.: US 9,753,186 B2
(45) Date of Patent: Sep. 5, 2017

(54) GLASS FIBER-SILSESQUIOXANE COMPOSITE MOLDED ARTICLE AND METHOD FOR PRODUCING SAME

(75) Inventors: Hironori Ikeno, Ichihara (JP); Kazuhiro Yoshida, Ichihara (JP)

(73) Assignee: JNC CORPORATION, Tokyo (JP)

( * ) Notice: Subject to any disclaimer, the term of this patent is extended or adjusted under 35 U.S.C. 154(b) by 1020 days.

(21) Appl. No.: 13/264,535

(22) PCT Filed: Apr. 14, 2010

(86) PCT No.: PCT/JP2010/056706
§ 371 (c)(1),
(2), (4) Date: Oct. 14, 2011

(87) PCT Pub. No.: WO2010/119903
PCT Pub. Date: Oct. 21, 2010

(65) Prior Publication Data
US 2012/0052296 A1 Mar. 1, 2012

(30) Foreign Application Priority Data
Apr. 14, 2009 (JP) ................. 2009-098479

(51) Int. Cl.
| B32B 1/00 | (2006.01) |
| B05D 3/06 | (2006.01) |
| B05D 3/00 | (2006.01) |
| G02B 1/04 | (2006.01) |
| C08G 77/04 | (2006.01) |
| C08G 77/38 | (2006.01) |
| C08J 5/04 | (2006.01) |
| C08L 83/06 | (2006.01) |
| C08G 77/12 | (2006.01) |
| C08G 77/20 | (2006.01) |
| C08G 77/00 | (2006.01) |
| G02F 1/1333 | (2006.01) |

(52) U.S. Cl.
CPC ............... *G02B 1/04* (2013.01); *C08G 77/04* (2013.01); *C08G 77/38* (2013.01); *C08J 5/043* (2013.01);
(Continued)

(58) Field of Classification Search
CPC .......... G02B 1/04; C08G 77/04; C08G 77/12; C08G 77/20; C08G 77/38; C08G 77/70;
(Continued)

(56) References Cited

U.S. PATENT DOCUMENTS

| 7,514,519 B2 | 4/2009 | Ootake et al. | |
| 2006/0052623 A1* | 3/2006 | Yoshida .................... | C07F 7/21 556/450 |

(Continued)

FOREIGN PATENT DOCUMENTS

| CN | 1832985 | 9/2006 |
| CN | 101014644 | 8/2007 |

(Continued)

OTHER PUBLICATIONS

A computerized English translation to JP 2008-201978 A, Sep. 2008, obtained from Japanese Patent Office website.*
(Continued)

*Primary Examiner* — Jeremy R Pierce
(74) *Attorney, Agent, or Firm* — Wenderoth, Lind & Ponack, L.L.P.

(57) ABSTRACT

Disclosed is a glass fiber-silsesquioxane composite molded article containing glass fibers and a cured material of a silsesquioxane polymer composited therewith, wherein the silsesquioxane has a polyhedral structure or a partially polyhedral structure. The glass fiber-silsesquioxane composite molded article is preferably obtained by impregnating glass fibers with a composition containing at least one of silsesquioxanes represented by formula (A-1) to (A-3) and at least one of a curing agent, a polymerization initiator, and a hydrosilylation catalyst, or the silsesquioxane polymer and allowing a curing reaction to proceed.

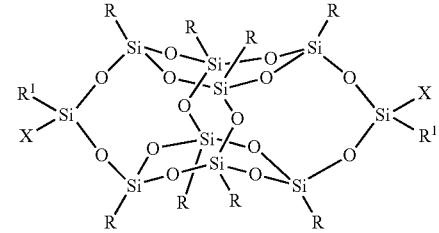

(A-1)

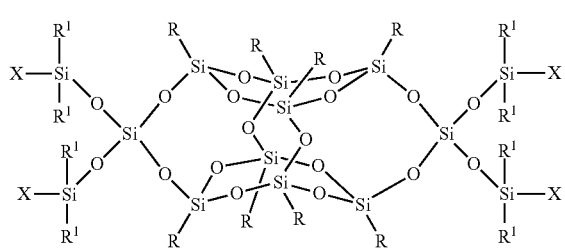

(A-2)

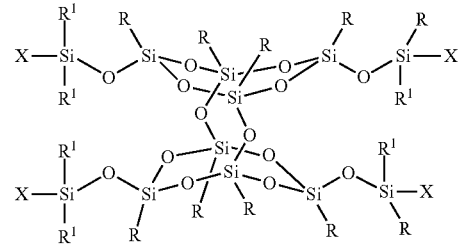

(A-3)

10 Claims, No Drawings

(52) U.S. Cl.
CPC .............. *C08L 83/06* (2013.01); *C08G 77/12* (2013.01); *C08G 77/20* (2013.01); *C08G 77/70* (2013.01); *C08J 2383/04* (2013.01); *C08L 2205/16* (2013.01); *G02F 1/133305* (2013.01); *Y10T 428/2971* (2015.01)

(58) Field of Classification Search
CPC ....... C08J 5/043; C08J 2383/04; C08L 83/06; C08L 2205/16; C08L 183/04; G02F 1/133305; Y10T 428/2971
See application file for complete search history.

(56) References Cited

U.S. PATENT DOCUMENTS

| | | | |
|---|---|---|---|
| 2006/0069216 A1 | 3/2006 | Isozaki et al. | |
| 2006/0116499 A1 | 6/2006 | Ootake et al. | |
| 2006/0175684 A1* | 8/2006 | Oikawa et al. | 257/632 |
| 2006/0182941 A1 | 8/2006 | Yano et al. | |
| 2006/0194068 A1* | 8/2006 | Katoh | C08G 73/106 428/447 |
| 2006/0204680 A1* | 9/2006 | Hattori | C09K 19/56 428/1.23 |
| 2007/0229950 A1* | 10/2007 | Ouderkirk et al. | 359/454 |
| 2008/0026180 A1 | 1/2008 | Bush et al. | |
| 2008/0071017 A1* | 3/2008 | Gordon et al. | 524/437 |
| 2008/0171846 A1* | 7/2008 | Ootake | C08G 77/14 528/25 |

FOREIGN PATENT DOCUMENTS

| | | | |
|---|---|---|---|
| JP | 10-086288 | | 4/1998 |
| JP | 2002309080 | A * | 10/2002 |
| JP | 2004/123936 | | 4/2004 |
| JP | 2006-089685 | | 4/2006 |
| JP | 2006/233154 | | 9/2006 |
| JP | 2007-45951 | | 2/2007 |
| JP | 2007-091963 | | 4/2007 |
| JP | 2007-119438 | | 5/2007 |
| JP | 2007-326988 | | 12/2007 |
| JP | 2007-332214 | | 12/2007 |
| JP | 2008/112942 | | 5/2008 |
| JP | 2008-201978 | | 9/2008 |
| JP | 2008-202027 | | 9/2008 |

OTHER PUBLICATIONS

A computerized English translation to JP 2008-202027 A (part 1), Sep. 2008, obtained from Japanese Patent Office website.*
A computerized English translation to JP 2008-202027 A (part 2), Sep. 2008, obtained from Japanese Patent Office website.*
International Search Report dated Jul. 13, 2010 in International (PCT) Application No. PCT/JP2010/056706.
English translation of the International Preliminary Report on Patentability and Written Opinion dated Nov. 15, 2011.
Japanese Office Action dated Jan. 20, 2015 in corresponding Japanese Application No. 2011-509321 (with English translation).

* cited by examiner

GLASS FIBER-SILSESQUIOXANE COMPOSITE MOLDED ARTICLE AND METHOD FOR PRODUCING SAME

This application is a U.S. national stage of International Application No. PCT/JP2010/056706 filed Apr. 14, 2010.

TECHNICAL FIELD

The present invention relates to a material, which is suitably used for applications such as flexible substrates used for flat panel displays, e.g., a substrate for liquid crystal display device, a substrate for an organic EL display device, and a substrate for a color filter, a substrate for a solar cell, a substrate for a touch panel, and a substrate for a plasma display, and which has a small linear expansion coefficient, is lightweight, and brings together transparency, heat resistance, and flexibility.

BACKGROUND ART

A glass plate has been generally used for a substrate for a liquid crystal display device, a substrate for an organic EL display device, a substrate for a color filter, a substrate for a solar cell, and the like. However, glass is a material that is brittle, cannot be bent, has a large specific gravity, and is unsuitable for weight reduction, for example. For that reason, studies on a plastic material as an alternative to the glass have started to be made in recent years. However, a general-purpose plastic material has a large linear expansion coefficient as compared to silver, copper, and the like, which are used for electrical circuit wiring, and hence involves problems such as peeling and breaking of wiring. In addition, heretofore, there has not been any plastic material having high transparency, weatherability, and a small birefringence simultaneously.

A silsesquioxane having a cage or partial cage structure is expected to express a specific function based on its characteristic structure, and hence has attracted attention from a variety of fields and has been studied for its application. In particular, the silsesquioxane has high transparency and heat resistance, and hence has attracted attention and has been studied as an alternative to the glass. For example, as a film substrate material used for a flat panel display, there are disclosed copolymers of a silicone resin containing a silsesquioxane having a cage structure and an acrylic resin (Patent Literatures 1 and 2). However, those copolymers each contain an acrylic resin, and hence there is no problem with mechanical strength and transparency, but weatherability is impaired in many cases. There are known film substrates each produced using a polymer containing a silsesquioxane skeleton in a main chain of the polymer without using an acrylic resin (Patent Literatures 3 and 4). Those film substrates not only have transparency but also do not undergo degradation under UV light and are excellent in weatherability, but the resultant films each have a large linear expansion coefficient. Further, an attempt at forming a film-like molded article from modified polyphenylene ether (PPE), in which a cage silsesquioxane has been incorporated, and a glass cloth has been made for the purpose of improving the fluidity of PPE. However, a processing temperature as high as 280° C. is required, and hence there is a problem with processability.

PRIOR ARTS

Patent Document

[Patent Document 1] JP 2004-123936 A
[Patent Document 2] JP 2006-089685 A
[Patent Document 3] JP 2006-233154 A
[Patent Document 4] JP 2008-112942 A
[Patent Document 5] JP 2008-201978 A

SUMMARY OF INVENTION

An object of the present invention is to provide a glass fiber-silsesquioxane composite molded article, which has a small linear expansion coefficient and thus can be suitably used for various substrates for flat panel displays, a substrate for a solar cell, a substrate for a touch panel, a substrate for a plasma display, and the like, and which has a small linear expansion coefficient, is transparent, and has heat resistance and flexibility.

The inventors of the present invention have made intensive studies in order to solve the above-mentioned problem. As a result, the inventors have found that a linear expansion coefficient can be reduced while high transparency and heat resistance being maintained by impregnating glass fiber with a composition containing a silsesquioxane represented by each of the formula (A-1) to (A-3) (hereinafter, also referred to as silsesquioxane-containing composition), or with a polymer of the silsesquioxane to form a composite. Thus, the present invention has been completed.

[1] A glass fiber-silsesquioxane composite molded article, comprising:

glass fiber; and a cured product of silsesquioxane polymer that forms a composite with the glass fiber, wherein the silsesquioxane has a cage structure or partial cage structure.

[2] The glass fiber-silsesquioxane composite molded article according to [1], wherein said glass fiber-silsesquioxane composite molded article is obtained by impregnating glass fiber with a silsesquioxane having a polymerizable functional group or with a polymer thereof and subjecting the resultant to a curing reaction.

[3] The glass fiber-silsesquioxane composite molded article according to [2], wherein: the silsesquioxane having said functional group is selected from the compounds represented by the following general formula (A-1) to (A-3); and the glass fiber-silsesquioxane composite molded article is obtained by impregnating glass fiber with a composition containing at least one kind of said compounds, and a curing agent, a polymerization initiator or a hydrosilylation catalyst, or with a composition formed of the polymer of the silsesquioxane and a solvent, and subjecting the resultant to a curing reaction:

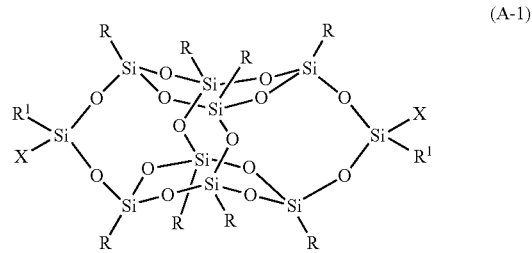

-continued

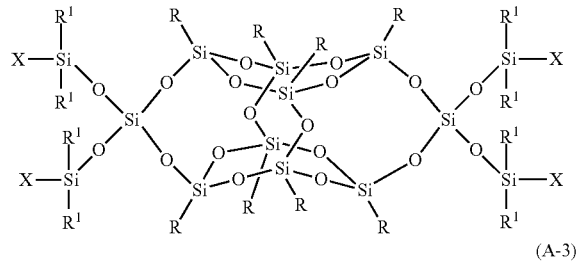

(A-2)

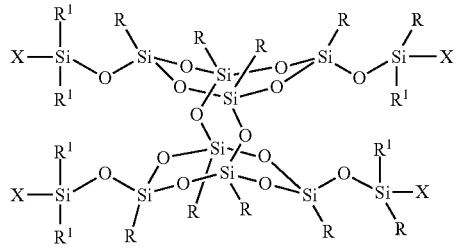

(A-3)

in the general formula (A-1) to (A-3):

R independently represent hydrogen; an alkyl having 1 to 45 carbon atoms in which any hydrogen may be substituted by fluorine and nonadjacent —$CH_2$— may be substituted by —O— or a cycloalkylene; a cycloalkyl having 4 to 8 carbon atoms; or an aryl in which any hydrogen may be substituted by an alkyl having 1 to 10 carbon atoms, halogen, or fluorine;

$R^1$ independently represent a group selected from an alkyl having 1 to 4 carbon atoms, cyclopentyl, cyclohexyl, and phenyl; and at least one of X represents hydrogen; a vinyl group; or an alkyl having 1 to 10 carbon atoms, a cycloalkyl, or phenyl each having a polymerizable functional group; and the remainder of X represents a group defined in the same manner as $R^1$.

[4] The glass fiber-silsesquioxane composite molded article according to [3], wherein the polymerizable functional group represented by X in the general formula (A-1) to (A-3) is oxiranyl, oxiranylene, 3,4-epoxycyclohexyl, oxetanyl, oxetanylene, acryl, or (meth)acryl.

[5] The glass fiber-silsesquioxane composite molded article according to [3], wherein: the curing agent is an acid anhydride or an amine; and the polymerization initiator is a cationic polymerization initiator or a radical polymerization initiator.

[6] The glass fiber-silsesquioxane composite molded article according to [3], wherein the glass fiber has a refractive index of 1.45 to 1.60.

[7] The glass fiber-silsesquioxane composite molded article according to [3], wherein the polymer of the silsesquioxane has a weight average molecular weight of 3,000 to 4,000,000.

[8] The glass fiber-silsesquioxane composite molded article according to [3], wherein the glass fiber-silsesquioxane composite molded article is obtained by mixing an epoxy resin or an oxetane resin into a composition containing at least one kind of the compounds represented by the general formula (A-1) to (A-3) and a curing agent, a polymerization initiator, or a hydrosilylation catalyst, or into a composition formed of the polymer of the silsesquioxane and a solvent, impregnating glass fiber with the resultant mixture, and subjecting the resultant to a curing reaction.

[9] A method for producing the glass fiber-silsesquioxane composite molded article according to [3], comprising the steps of: impregnating glass fiber with a composition containing at least one kind of the compounds represented by the general formula (A-1) to (A-3) and a curing agent, or a polymerization initiator, or with a composition formed of the polymer of the silsesquioxane and a solvent; and subjecting the resultant to a heat curing reaction.

[10] A method for producing the glass fiber-silsesquioxane composite molded article according to [3], comprising the steps of: impregnating glass fiber with a composition containing at least one kind of the compounds represented by the general formula (A-1) to (A-3) and a polymerization initiator, or with a composition formed of the polymer of the silsesquioxane and a solvent; and subjecting the resultant to a photocuring reaction.

[11] A substrate for a liquid crystal display device, comprising the glass fiber-silsesquioxane composite molded article according to any one of [1] to [8].

[12] A substrate for an organic EL display device, comprising the glass fiber-silsesquioxane composite molded article according to any one of [1] to [8].

[13] A substrate for a plasma display, comprising the glass fiber-silsesquioxane composite molded article according to any one of [1] to [8].

[14] A substrate for a color filter, comprising the glass fiber-silsesquioxane composite molded article according to any one of [1] to [8].

[15] A substrate for a solar cell, comprising the glass fiber-silsesquioxane composite molded article according to any one of [1] to [8].

[16] A substrate for a touch panel, comprising the glass fiber-silsesquioxane composite molded article according to any one of [1] to [8].

The glass fiber-silsesquioxane composite molded article of the present invention (hereinafter, also referred to as silsesquioxane molded article of the present invention or molded article of the present invention) has a small linear expansion coefficient, is excellent in transparency, can be bent, and is excellent in electrical characteristic such as insulation property and weather ability, and hence can be suitably used, as an alternative to a glass plate, for a substrate for a liquid crystal display device, a substrate for an organic EL display device, a substrate for a color filter, a substrate for a solar cell, a substrate for a touch panel, a substrate for a plasma display, and the like.

DESCRIPTION OF EMBODIMENTS

Hereinafter, the present invention is specifically described.

<Silsesquioxane Having Polymerizable Functional Group>

A silsesquioxane having a polymerizable functional group used for producing a molded article of the present invention has only to be one having a cage or partial cage structure, and is preferably represented by each of the general formula (A-1) to (A-3). A compound represented by the formula (A-1) or (A-2) has a cage structure, and a compound represented by the formula (A-3) has a partial cage structure. It should be noted that a cage silsesquioxane is a silsesquioxane having a closed space, whereas a partial cage silsesquioxane is a compound having a structure in a state in which Si—O—Si bonds each forming its skeleton are partially cleaved and a closed space is opened.

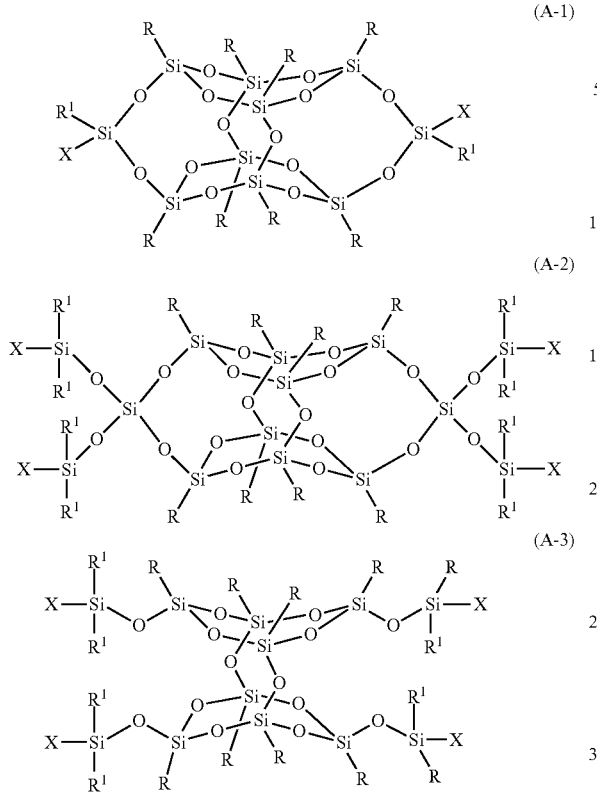

(A-1)

(A-2)

(A-3)

In the formula (A-1) to (A-3): R independently represent hydrogen, an alkyl having 1 to 45 carbon atoms in which any hydrogen may be substituted by fluorine and nonadjacent —$CH_2$— may be substituted by —O— or a cycloalkylene, a cycloalkyl having 4 to 8 carbon atoms, or an aryl in which any hydrogen may be substituted by an alkyl having 1 to 10 carbon atoms, a halogen, or fluorine; $R^1$ independently represent a group selected from an alkyl having 1 to 4 carbon atoms, cyclopentyl, cyclohexyl, and phenyl; and at least one of X represents hydrogen or a group having a polymerizable functional group, and the remainder of X represents a group defined in the same manner as $R^1$. When R represent hydrogen, only one of X may represent hydrogen. When X represent a polymerizable functional group, it is preferred that at least two of X represent a polymerizable functional group.

Of these, a silsesquioxane having a partial cage structure represented by the formula (A-3) is preferred in consideration of compatibility with an organic solvent, an epoxy resin, an oxetane resin, or a (meth)acrylic acid monomer and solubility of a curing agent, a polymerization initiator, and other various additives.

These compounds may also be synthesized by known synthesis methods.

For example, a silsesquioxane having a cage structure represented by the formula (A-1) can be synthesized in accordance with the method described in WO 2003/024870 A1 or JP 2006-265243 A.

A silsesquioxane having a cage structure represented by the formula (A-2) can be synthesized by the method described in JP 2008-150478 A.

A silsesquioxane (A-3) having a partial cage structure can be easily synthesized by the method described in WO 2004/024741 A1.

In the formula (A-1) to (A-3), a polymerizable functional group represented by X is not particularly limited as long as it is a functional group which can be addition-polymerized, ring-opening-polymerized, or polycondensed, and examples thereof include oxiranyl, oxiranylene, 3,4-epoxycyclohexyl, oxetanyl, oxetanylene, acryl or (meth)acryl, alkenyl, amine, and 2-oxapropane-1,3-dioyl groups. Of these, an epoxy or an oxetane excellent in transparency, heat resistance, and electrical characteristic is particularly suitable. Specific examples thereof include groups represented by the following formula (a) to (h). It should be noted that, in the present invention, a three-membered cyclic ether and a four-membered cyclic ether are referred to as epoxy and oxetane, respectively, and compounds having two or more epoxies and oxetanes in one molecule are sometimes referred to as epoxy resin and oxetane resin, respectively.

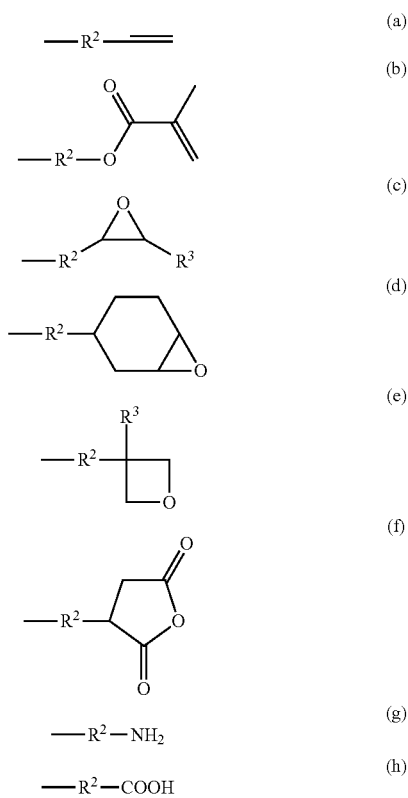

In the formula (a) to (h), $R^2$ represents an alkylene having 1 to 10 carbon atoms, preferably an alkylene having 1 to 6 carbon atoms. One —$CH_2$— in this alkylene may be substituted by —O— or 1,4-phenylene. In addition, $R^3$ represents hydrogen or an alkyl having 1 to 6 carbon atoms, preferably hydrogen.

<Silsesquioxane Polymer>

The silsesquioxane polymer refers to a B-stage polymer, i.e., a polymer that can be redissolved in a solvent (in an incompletely cured and semi-cured state) obtained by carrying out addition polymerization, ring-opening polymerization, or polycondensation using any one or a plurality of the silsesquioxanes represented by the formula (A-1) to (A-3) and another monomer as necessary.

The weight average molecular weight of the polymer falls within preferably the range of 3,000 to 4,000,000, more preferably the range of 10,000 to 200,000.

When any one or a plurality of the silsesquioxanes represented by the formula (A-1) to (A-3) and another monomer are subjected to copolymerization, examples of the another monomer which can be used include the following compound.

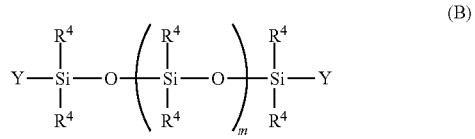
(B)

In the formula (B): $R^4$ independently represent an alkyl having 1 to 4 carbon atoms or phenyl; m represents an integer of 0 to 1,000, preferably an integer of 0 to 150; and Y represent hydrogen or vinyl.

Commercially available compounds (B) may be used, and compounds (B) that are not commercially available may also be used by synthesizing, for example, with reference to the method described in JP 2003-252995 A.

For example, as an example in the case where X represent an alkenyl in the formula (A-1) to (A-3) and Y represent hydrogen in the formula (B), a silsesquioxane having an alkenyl group and a silsesquioxane and/or a polydiorganosiloxane each having an SiH group can be subjected to a reaction in the presence of a hydrosilylation catalyst by the method described in WO 2004/018084 A1 to obtain a polymer having a molecular weight of 3,000 to 4,000,000.

<Hydrosilylation Catalyst>

The use of a hydrosilylation catalyst as a polymerization initiator allows a hydrosilylation reaction to progress easier. Preferred examples of the hydrosilylation catalyst include a Karstedt catalyst and a Spier catalyst. These are generally well known catalysts. The addition of any one of these hydrosilylation catalysts in a small amount allows the reaction to sufficiently progress because the catalysts each have a high activity. Each of these hydrosilylation catalysts is used in such an amount that a ratio of a platinum group metal contained in the catalyst to Si—H is $10^{-9}$ to 1 mol %. The catalyst is preferably added in such a manner that the ratio is $10^{-7}$ to $10^{-3}$ mol %.

In the case of using a silsesquioxane having an epoxy or an oxetane as the polymerizable functional group X, it is preferred to carry out polymerization using a curing agent or a polymerization initiator. The curing agent is not particularly limited as long as it is a compound that is generally used for the curing of an epoxy resin, and an amine, an acid anhydride, and the like may be used.

<Curing Agent: Acid Anhydride>

Specific examples of the acid anhydride include phthalic anhydride, maleic anhydride, trimellitic anhydride, pyromellitic anhydride, hexahydrophthalic anhydride, 3-methyl-cyclohexanedicarboxylic anhydride, 4-methyl-cyclohexanedicarboxylic anhydride, a mixture of 3-methyl-cyclohexanedicarboxylic anhydride and 4-methyl-cyclohexanedicarboxylic anhydride, tetrahydrophthalic anhydride, nadic anhydride, methylnadic anhydride, norbornane-2,3-dicarboxylic anhydride, methylnorbornane-2,3-dicarboxylic anhydride, cyclohexane-1,3,4-tricarboxylic-3,4-anhydride, and derivatives thereof. Of these, 4-methyl-cyclohexanedicarboxylic anhydride and a mixture of 3-methyl-cyclohexanedicarboxylic anhydride and 4-methyl-cyclohexanedicarboxylic anhydride are suitable because they are liquid at room temperature and hence easily handled.

When the acid anhydride is used as the curing agent, a curing accelerator may be further used. Examples of the curing accelerator include tetraphenylphosphonium bromide, tetrabutylphosphonium bromide, methyltriphenylphosphonium bromide, ethyltriphenylphosphonium bromide, n-butyltriphenylphosphonium bromide, 1,8-diazabicyclo(5,4,0) undecene-7,2-methylimidazole, and 2-phenyl-4-methylimidazole. However, the curing accelerator is not limited thereto as long as it has good curing property and does not cause coloring. These curing accelerators may be used each alone or in combination of two or more kinds thereof. Of these, bicyclic amidines such as 1,8-diazabicyclo(5,4,0)undecene-7 and imidazoles are more preferred because each of them shows a high activity for an epoxy resin even in a small addition amount and allows the curing to be carried out within a short period of time even at a relatively low curing temperature.

<Curing Agent: Amine>

Specific examples of the amine to be used as the curing agent include ethylenediamine, diethylenetriamine, triethylenetetramine, tetraethylenepentamine, dimethylaminopropylamine, diethylaminopropylamine, hexamethylenetriamine, biscyanoethylamine, tetramethylguanidine, pyridine, piperidine, methanediamine, isophoronediamine, 1,3-bisaminomethyl-cyclohexane, bis(4-amino-cyclohexyl)methane, bis(4-amino-3-methyl-cyclohexyl)methane, benzylmethylamine, α-methyl-benzylmethylamine, m-phenylenediamine, m-xylylenediamine, diaminodiphenylmethane, diaminodiphenyl sulfone, and diaminodiphenyl ether.

When an acid anhydride or an amine is used as the curing agent, the use ratio of the acid anhydride or the amine is preferably 0.7 to 1.2 equivalents, more preferably 0.9 to 1.1 equivalents with respect to 1 equivalent of an epoxy or an oxetane contained in a silsesquioxane. In order to obtain a completely cured, satisfactory product, it is preferred to use the acid anhydride or the amine in the above-mentioned range.

When a curing accelerator is further used, the preferred use ratio of the curing accelerator is not particularly limited as long as a curing acceleration effect is observed, physical properties of a cured product are not degraded, and a cured product is not colored. In general, the weight ratio of the curing accelerator to the amount of a silsesquioxane in a silsesquioxane-containing composition or a silsesquioxane polymer-containing composition (to the total amount of the silsesquioxane, the epoxy resin, and the oxetane resin in the case where the composition contains an epoxy resin and an oxetane resin) is preferably 0.005 to 5.0 wt %, more preferably 0.05 to 1.0 wt %.

<Polymerization Initiator>

The polymerization initiator can be appropriately selected and used depending on the kind of X, and a cationic polymerization initiator can be generally used. Examples thereof include an active energy ray cationic polymerization initiator, which generates a cationic species or a Lewis acid with an active energy ray such as UV light, and a thermal cationic polymerization initiator, which generates a cationic species or a Lewis acid with heat. Examples of the active energy ray cationic polymerization initiator include a metal fluoroboron complex salt, a boron trifluoride complex compound, a bis(perfluoroalkylsulfonyl)methane metal salt, an aryldiazonium compound, an aromatic onium salt of a Group VIa element, an aromatic onium salt of a Group Va element, dicarbonyl chelates of Group IIIa to Va elements, a thiopyrylium salt, $MF_6$ (Group VIb element in the form of an anion; M is selected from phosphorus, antimony, and arsenic), an arylsulfonium complex salt, an aromatic iodonium complex salt, an aromatic sulfonium complex salt, and a bis[4-(diphenylsulfonio)phenyl]sulfide-bis-hexafluorometal salt. Further, a mixed ligand metal salt of an iron compound and a silanol-aluminum complex may also be used.

Examples of the active energy ray cationic polymerization initiator include an arylsulfonium complex salt, an aromatic sulfonium or iodonium salt of a halogen-containing complex ion, and aromatic onium salts of Group II, Group V, and Group VI elements. Some of these salts are available as commercial products.

As the thermal cationic polymerization initiator, there can be used a cationic initiator such as a triflic acid salt or boron trifluoride, or a protonic acid catalyst. A preferred example of the thermal cationic polymerization initiator is a triflic acid salt, and specific examples thereof include diethylammonium triflate, diisopropylammonium triflate, and ethyldiisopropylammonium triflate. Meanwhile, some of the aromatic onium salts that can be used as the active energy ray cationic polymerization initiator generate a cationic species with heat and can be used as the thermal cationic polymerization initiator as well.

Of these cationic polymerization initiators, aromatic onium salts are preferred because they are excellent in handleability and in balance between latency and curing property. Of these, a diazonium salt, an iodonium salt, a sulfonium salt, and a phosphonium salt are preferred because they are excellent in balance between handleability and latency. The cationic polymerization initiators may be used alone, or two kinds or more thereof may be used in combination.

The preferred use ratio of the cationic polymerization initiator is not particularly limited. However, in order that a curing reaction progresses sufficiently, a cured product of interest can be obtained, physical properties of a cured product are not degraded, and a cured product is not colored, the weight percent of the cationic polymerization initiator to the amount of a silsesquioxane in a silsesquioxane-containing composition or a silsesquioxane polymer-containing composition (to the total amount of the silsesquioxane, the epoxy resin, and the oxetane resin in the case where the composition contains an epoxy resin and an oxetane resin) is preferably 0.01 to 10.0 wt %, more preferably 0.05 to 3.0 wt %.

The glass fiber-silsesquioxane composite molded article of the present invention may be a product obtained by impregnating glass fiber with a polymer of each of the silsesquioxanes (A-1) to (A-3) and an epoxy resin or an oxetane resin, and curing the resultant.

The epoxy resin or oxetane resin is exemplified below. Examples of the epoxy resin include bisphenol type epoxy resins (such as a bisphenol A type epoxy resin, a bisphenol F type epoxy resin, and a bisphenol S type epoxy resin), epoxy resins each having two oxiranyl groups (such as a biphenyl type epoxy resin and a hydrogenated bisphenol A type epoxy resin), polyfunctional heterocyclic epoxy resins (such as a phenol novolac type epoxy resin, a cresol novolac type epoxy resin, an alkyl-modified triphenolmethane type epoxy resin, and triglycidyl isocyanurate), epoxy resins each having three or more oxiranyl groups (polyfunctional alicyclic epoxy resins such as poly(epoxidized cyclohexene oxide), and alicyclic epoxy resins (product name: CELLOXIDE 2021, product name: CELLOXIDE 3000, and product name: CELLOXIDE 2081, all manufactured by DAICEL CHEMICAL INDUSTRIES, LTD.). Examples of the oxetane resin include ARONE OXETANES manufactured by TOAGOSEI CO., LTD., such as product name OXT-101: 3-ethyl-3-hydroxymethyloxetane, product name OXT-212: 2-ethylhexyloxetane, product name OXT-121: xylylenebisoxetane, and product name OXT-221: 3-ethyl-3{[(3-ethyloxetan-3-yl) methoxy]methyl}oxetane. Of these, an alicyclic epoxy resin or oxetane resin causing little coloring is more preferably used from the viewpoint of transparency. These epoxy resins or oxetane resins may be used each alone or in combination of two or more kinds thereof.

When such epoxy resin or oxetane resin is used, the blending ratio of the epoxy resin or oxetane resin is preferably 5 to 50 wt %, more preferably in the range of 10 to 30 wt % based on the weight of the silsesquioxane.

It should be noted that a molded article, which does not contain an epoxy resin and an oxetane resin, and is obtained by impregnating glass fiber with only the polymer of the silsesquioxane represented by each of the formula (A-1) to (A-3) and curing the resultant, is also included in the molded article of the present invention, and such molded article is preferred because it can be simply produced as compared to a conventional molded article.

<Additives>

An antioxidant may be added in the production of the glass fiber-silsesquioxane composite molded article of the present invention. The addition of the antioxidant can prevent oxidation degradation and form a less colored molded article. Examples of the antioxidant include phenol-based, sulfur-based, and phosphorus-based antioxidants. When the antioxidant is used, the preferred blending ratio of the antioxidant is not particularly limited, and the weight ratio of the antioxidant to the silsesquioxane or the polymer of the silsesquioxane is preferably 0.0001 to 1.0 wt %, more preferably 0.01 to 0.1 wt %.

Specific examples of the antioxidant include monophenols (such as 2,6-di-t-butyl-p-cresol, butylatedhydroxyanisole, 2,6-di-t-butyl-p-ethylphenol, and stearyl-β-(3,5-di-t-butyl-4-hydroxyphenyl)propionate), bisphenols (2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), and 3,9-bis[1,1-dimethyl-2-{β-(3-t-butyl-4-hydroxy-5-methylphenyl)propionyloxy}ethyl]2,4,8,10-tetraoxaspiro[5,5]undecane), polymeric phenols (such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl) propionate]methane, bis[3,3'-bis-(4'-hydroxy-3'-t-butylphenyl)butyric acid] glycol ester, 1,3,5-tris(3',5'-di-t-butyl-4'-hydroxybenzyl)-S-triazine-2,4,6-(1H,3H,5H)trione, and tocopherol), sulfur-based antioxidants (such as dilauryl-3,3'-thiodipropionate, dimyristyl-3,3'-thiodipropionate, and distearyl-3,3'-thiodipropionate), phosphites (such as triphenyl phosphite, diphenyl isodecyl phosphite, phenyl diisodecyl phosphite, tris(nonylphenyl) phosphite, diisodecyl pentaerythritol phosphite, tris(2,4-di-t-butylphenyl) phosphite, cyclic neopentanetetraylbis(octadecyl) phosphite, cyclic neopentanetetraylbis(2,4-di-t-butylphenyl) phosphite, cyclic neopentanetetraylbis(2,4-di-t-butyl-4-methylphenyl) phosphite, and bis[2-t-butyl-6-methyl-4-{2-(octadecyloxycarbonyl)ethyl}phenyl]hydrogen phosphite), and oxaphosphaphenanthrene oxides (such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene-10-oxide). Each of these antioxidants may be used alone, but a combination of phenol-based/sulfur-based antioxidants or a combination of phenol-based/phosphorus-based antioxidants is particularly preferably used. As a commercially available phenol-based antioxidant, an IRGANOX 1010 (trade name) and an IRGAFOS 168 (trade name) manufactured by Ciba Japan K.K. may be used each alone or as a mixture thereof.

A UV absorber may be blended into the glass fiber-silsesquioxane composite molded article of the present invention in order to improve light resistance. As the UV absorber, a general UV absorber for plastics can be used, and the preferred blending ratio thereof is not particularly limited. The weight ratio of the UV absorber to the silsesquioxane or the polymer of the silsesquioxane is preferably 0.0001 to 1.0 wt %, more preferably 0.001 to 0.1 wt %.

Specific examples of the UV absorber include: salicylates such as phenyl salicylate, p-t-butylphenyl salicylate, and p-octylphenyl salicylate; benzophenones such as 2,4-dihydroxybenzophenone, 2-hydroxy-4-methoxy-benzophenone, 2-hydroxy-4-octoxy-benzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone; benzotriazoles such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, and 2-{(2'-hydroxy-3',3",4",5",6"-tetrahydrophthalimidomethyl)-5'-methylphenyl}benzotriazole; and hindered amines such as bis(2,2,6,6-tetramethyl-4-piperidyl) sebacate, bis(1,2,2,6,6-pentamethyl-4-piperidyl) sebacate, and bis(1,2,2,6,6-pentamethyl-4-piperidyl)[{3,5-bis(1,1-dimethylethyl)-4-hydroxyphenyl}methyl]butyl malonate.

In addition, the glass fiber-silsesquioxane composite molded article of the present invention may be further blended with the following components.
(1) Powdery reinforcing agents and fillers containing metal oxides such as aluminum oxide and magnesium oxide, silicon compounds such as fine powder silica, molten silica, and crystal silica, transparent fillers such as glass beads, metal hydroxides such as aluminum hydroxide, and others such as kaolin, mica, quartz powder, graphite, and molybdenum disulfide. These components may be blended in such a range that the transparency of the glass fiber-silsesquioxane composite molded article of the present invention is not impaired. The preferred blending ratio of these components falls within the range of 0.10 to 1.0 wt % in terms of a weight ratio of the reinforcing agent or the filler with respect to the silsesquioxane or the polymer of the silsesquioxane of the present invention.
(2) Colorants or pigments such as titanium dioxide, molybdate orange, iron blue, ultramarine blue, cadmium yellow, cadmium red, and an organic dye.
(3) Flame retardants such as antimony trioxide, a bromine compound, and a phosphorus compound.
(4) Ion adsorbents.

The preferred blending ratio of these components is 0.0001 to 0.30 in terms of a weight ratio with respect to the weight of the silsesquioxane or the polymer of the silsesquioxane.
(5) Silane coupling agents.
(6) Nanoparticle dispersion liquids of metal oxides such as zirconia, titania, alumina, and silica.

The preferred blending ratio of these components (1) to (6) is 0.01 to 0.50 in terms of a weight ratio with respect to the weight of the silsesquioxane or the polymer of the silsesquioxane.

As described above, the molded article of the present invention is obtained by impregnating glass fiber with a composition containing the silsesquioxane represented by each of the formula (A-1) to (A-3) and a curing agent or a polymerization initiator, and as necessary together with an epoxy resin or an oxetane resin, and carrying out polymerization and curing of the silsesquioxane simultaneously. Alternatively, the molded article may be obtained by impregnating glass fiber with the polymer of the silsesquioxane represented by each of the formula (A-1) to (A-3) and as necessary together with an epoxy resin or an oxetane resin, and curing the resultant.

<Glass Fiber>

Any of glass fibers having various shapes such as a filament yarn, a glass cloth, and a nonwoven fabric can be used in the present invention. In particular, the glass cloth has high transparency and is effective for reducing a linear expansion coefficient, and hence can be suitably used. The glass cloth may be obtained by forming molten glass into a fine filament, and then plain-weaving the fine filament into a cloth shape. There exist E glass, C glass, NE glass, T glass, AR glass, and the like depending on the composition of glass to be used as a raw material. Of these, a glass cloth which has a thickness of 10 to 300 μm and is made of E glass or T glass with little ionic impurities such as alkali metals is preferred because these are sold on the market and are easily available.

The refractive index of the glass cloth suitable in the present invention is not particularly limited, and falls within preferably the range of 1.45 to 1.60, more preferably the range of 1.50 to 1.60 in order to easily adjust the refractive index of a resin to be combined.

The use ratio of the glass cloth in the present invention is 20 to 80 wt %, more preferably 30 to 70 wt % with respect to the total amount of the glass fiber-silsesquioxane composite molded article.

<Production Method for Glass Fiber-Silsesquioxane Composite Molded Article>

As described above, the glass fiber-silsesquioxane composite molded article of the present invention is preferably obtained by impregnating glass fiber with a composition containing the silsesquioxane represented by each of the above-mentioned formula (A-1) to (A-3) and a curing agent, a polymerization initiator, or a hydrosilylation catalyst, or with a composition composed of a silsesquioxane polymer and a solvent and as necessary together with an epoxy resin or an oxetane resin, and subjecting the resultant to a curing reaction.

A method for producing the molded article of the present invention is not particularly limited, and examples thereof include a method comprising mixing an epoxy resin or an oxetane resin and an organic solvent with a silsesquioxane and a curing agent or a polymerization initiator, or with a silsesquioxane polymer and various additives, then carrying out degassing under reduced pressure to prepare a composition in which dissolved air is removed, impregnating a glass cloth with the composition so as to prevent air bubbles from entering, and then heating the glass cloth at a given temperature for a given period of time. In the heating, a polymer may be made into a polymer in an incompletely cured and semi-cured state, i.e., a B-stage polymer, then sandwiched with a pressing machine, and cured by heating while applying a pressure, to thereby obtain a molded article having a more smooth surface. A temperature in heat curing is appropriately set depending on a polymerizable functional group possessed by a silsesquioxane to be used. Further, depending on the kind of the polymerizable functional group possessed by the silsesquioxane, a curing reaction may be performed by photo curing comprising adding a photo acid generator to a silsesquioxane-containing composition or silsesquioxane polymer-containing composition.

An organic solvent used for the preparation of the silsesquioxane-containing composition or the silsesquioxane polymer-containing composition has only to be capable of dissolving the composition or the polymer, and is not particularly limited. Preferred organic solvents are: hydrocarbon-based solvents such as hexane and heptane; aromatic hydrocarbon-based solvents such as toluene, xylene, mesitylene, and anisole; ether-based solvents such as diethyl ether, tetrahydrofuran (hereinafter, referred to as THF), dioxane, 1,2-dimethoxyethane, 1,2-diethoxyethane, and propylene glycol monomethyl ether; halogenated hydrocarbon-based solvents such as methylene chloride and carbon tetrachloride; ester-based solvents such as ethyl acetate; glycol ester-based solvents such as propylene glycol monomethyl ether acetate; and ketones such as methyl ethyl ketone, methyl isopropyl ketone, and methyl isobutyl ketone. Of these, particularly preferred are toluene, mesitylene, anisole, tetrahydrofuran, cyclopentyl methyl ether, 1,2-dimethoxyethane, propylene glycol monomethyl ether acetate, and 2-(2-ethoxyethoxy)ethyl acetate. These solvents may be used each alone or as a mixture of two or more.

Although it is not necessary to use an organic solvent in impregnating glass fiber with a polymer, a resin concentration in the case of performing dilution with a solvent is set to preferably 5 wt % or more and 99 wt % or less, more preferably 30 wt % or more and 90 wt % or less. In the case where no organic solvent is used, like Example 6 to be described later, the silsesquioxane-containing composition or the polymer is allowed to adhere to glass fiber using a pressing machine or the like, the resultant is applied with heat to melt the polymer, and the molten polymer may also be impregnated into glass fiber. In this case, impregnation and heat curing can be simultaneously achieved.

The glass fiber-silsesquioxane composite molded article obtained as described above has high transparency, has a small linear expansion coefficient, and is lightweight, and hence can be used for applications such as a substrate for a liquid crystal display device, a substrate for an organic EL display device, a substrate for a color filter, a substrate for a solar cell, a substrate for a touch panel, and a substrate for a plasma display. Alternatively, the glass fiber-silsesquioxane composite molded article may be formed on a glass substrate, a plastic substrate, a film substrate, a metal substrate, or the like, to thereby prepare a substrate of the present invention.

EXAMPLES

The present invention is described in more detail based on examples, but the present invention is not limited by the following examples.

The weight average molecular weight of a silsesquioxane polymer can be measured by a gel permeation chromatography (GPC) method. Specifically, the weight average molecular weight was determined in terms of standard polymethyl methacrylate by diluting the silsesquioxane polymer with tetrahydrofuran (THF) so that the concentration was about 0.05 to 0.10 wt %, and carrying out measurement using columns KF-805L and KF-804L manufactured by Showa Denko K.K. and using THF as a developing agent.

Synthesis Example 1

Synthesis of Compound (II)

Compound (II) was synthesized through the following route.

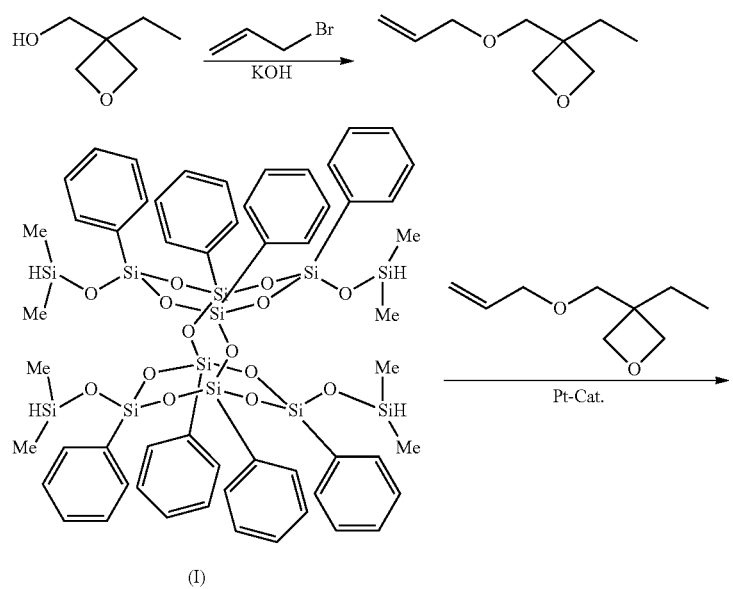

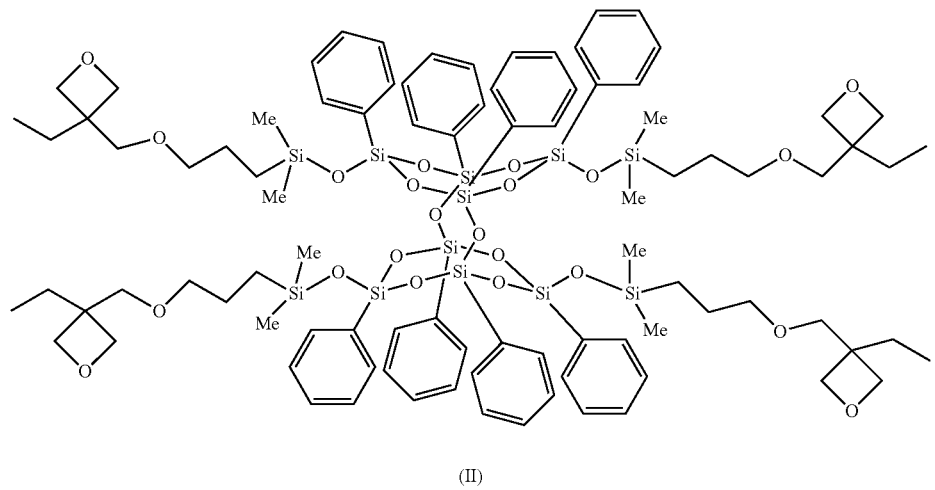

(II)

First Stage: Synthesis of 3-allyloxymethyl-3-ethyl-oxetane

Under a nitrogen atmosphere, a 50 wt % aqueous solution of potassium hydroxide (2,500 g) and 3-ethyl-3-hydroxymethyloxetane (580 g, 50 mol), and tetrabutylammonium bromide (50 g) were added to a reaction container having an internal volume of 2.0 L equipped with a temperature gauge, a dropping funnel, and a reflux condenser. Then, allyl bromide (1,210 g, 100 mol) was added dropwise to the mixture from the dropping funnel while stirring. After the completion of the dropwise addition, the reaction mixture was stirred at room temperature for 24 hours, then supplemented with water, and extracted with hexane. The organic layer was washed with water and then dried over anhydrous magnesium sulfate. The solvent was then removed by concentration under reduced pressure. After that, distillation was performed under reduced pressure to obtain 780 g (89% yield) of 3-allyloxymethyl-3-ethyl-oxetane as a fraction at a pressure of 1.4 kPa and a column top temperature of 76° C.

Second Stage: Synthesis of Compound (II)

Compound (II) was synthesized in accordance with the method disclosed in WO 2004/024741 A1. Specifically, under a nitrogen atmosphere, Compound (I) (400 g) and toluene (620 g) were loaded into a reaction container having an internal volume of 2.0 L equipped with a temperature gauge, a dropping funnel, and a reflux condenser, and the mixture was heated with stirring with a magnetic stirrer so that the liquid temperature was 80° C. Pt catalyst (product name: Pt-VTSC-3.0× (3 wt % solution of platinum in xylene) manufactured by Umicore Precious Metals Refining) (80 μL) was added with a microsyringe, and 3-allyloxymethyl-3-ethyl-oxetane (288 g) synthesized in the first stage was then added. After that, the mixture was stirred at a reflux temperature for 3 hours and then cooled to room temperature. Then, SH silica (product name: 2.0 g) manufactured by FUJI SILYSIA CHEMICAL LTD. was added and the mixture was stirred for 1 hour. The SH silica was filtered and the resultant filtrate was concentrated with an evaporator. Methanol (3,000 g) was added to the resultant concentrate and active carbon (18 g) was further added, and the mixture was stirred at room temperature for 1 hour. The active carbon was removed by filtration and the filtrate was concentrated with an evaporator to obtain 595 g of a colorless viscous liquid. The $^1$H-NMR measurement results revealed that the resultant compound was Compound (II) (83% yield).

Synthesis Example 2

Production of Polymer (VI) Formed of Silsesquioxane

Polymer (VI) was produced through the following route.

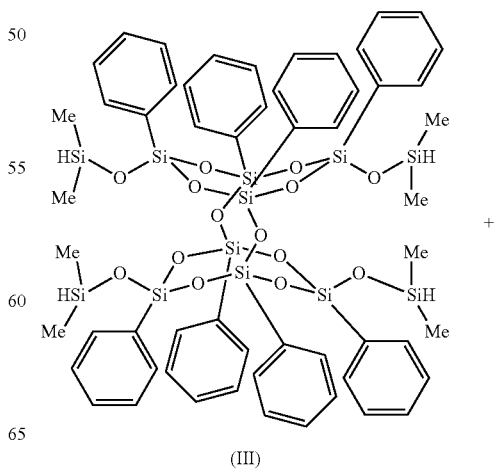

(III)

+

-continued

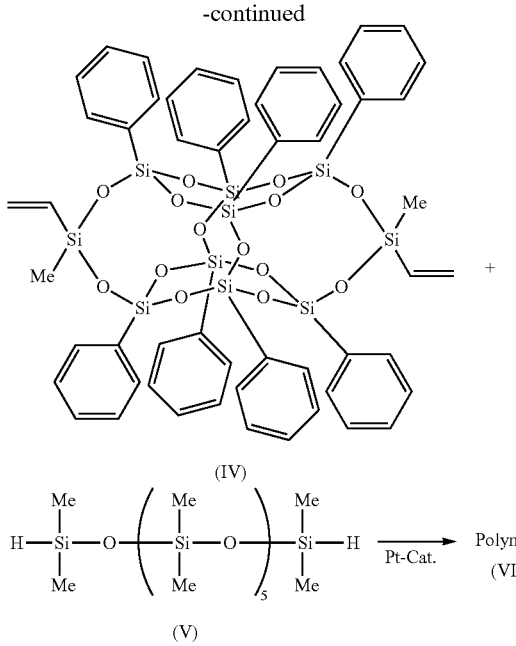

Here, Compound (III) and Compound (IV), which were synthesized in accordance with the method of WO 2004/024741 A1 and the method of WO 2003/024870 A1, respectively, were used.

Compound (III) (157 g) Compound (IV) (64 g), dual-end Si—H silicone (product name FM-1105 manufactured by CHISSO CORPORATION, weight average molecular weight: 600) (V) (19 g), and toluene (960 g) were loaded into a reaction container equipped with a temperature gauge, a reflux condenser, and a stirrer, and the mixture was heated to 100° C. with stirring under a nitrogen gas stream. Pt-VTSC-3.0× (8.5 μl) was added and polymerization was then performed for 15.5 hours. After that, the resultant was cooled to 10° C. or less in an ice bath and then concentrated under reduced pressure to obtain a colorless solid. The resultant colorless solid was dried under reduced pressure at 60° C. for 3 hours to obtain a colorless solid (234 g). The thus obtained solid had a molecular weight of weight average molecular weight (Mw) of 168, 500. It should be noted that the weight average molecular weight is a value determined by GPC.

Synthesis Example 3

Synthesis of Compound (VII)

Compound (VII) was synthesized through the following synthesis route in accordance with the method described in JP 2009-167390 A.

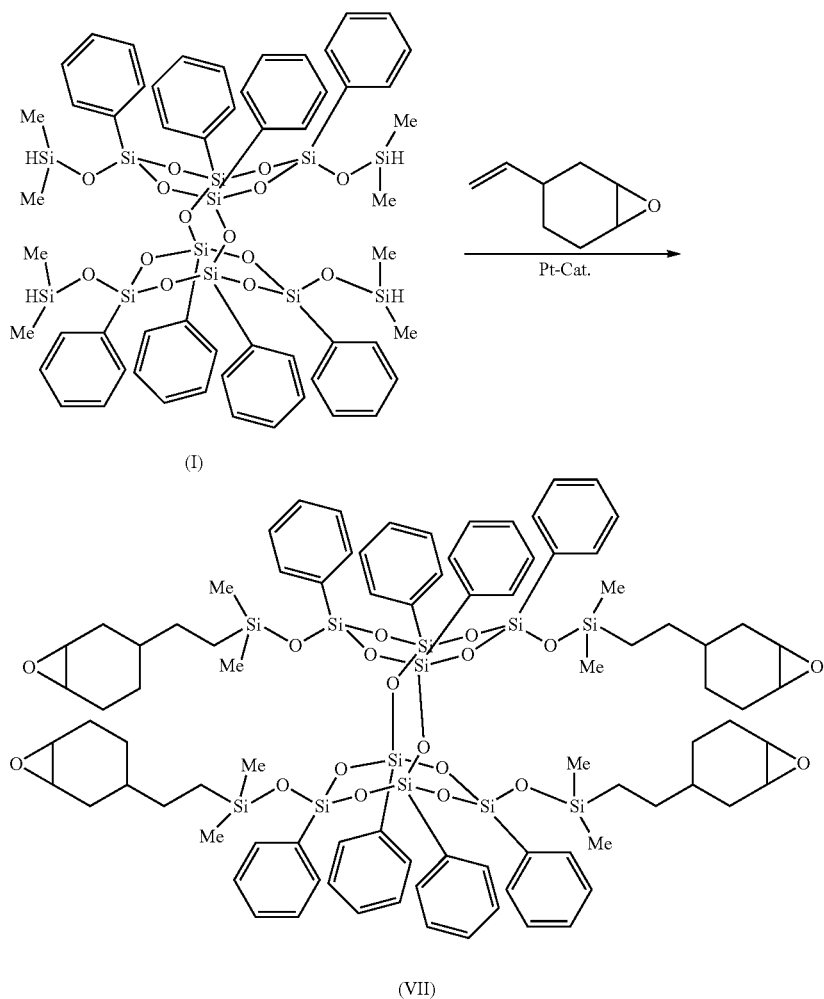

Under a nitrogen atmosphere, Compound (I) (21.0 g) and dry toluene (20 g) were loaded into a reaction container having an internal volume of 200 mL equipped with a temperature gauge, a dropping funnel, and a reflux condenser, and sealing was performed with dry nitrogen. The mixture was heated with stirring with a magnetic stirrer so that the reaction temperature was 60° C. Pt catalyst (21 µL) was added with a microsyringe, and Celloxide (trade name) 2000 (product name: CEL2000) manufactured by Daicel Chemical Industries, Ltd. (10 g) was slowly added dropwise from the dropping funnel. After that, the mixture was stirred for 3 hours. The reaction solution was concentrated with an evaporator, and the residue was then dissolved with acetone to prepare a 20 wt % solution. 3 wt % active carbon was added to the residue, and the mixture was stirred for 1 hour. Then, the active carbon was filtered and the resultant filtrate was concentrated. The resultant residue was dissolved with a 10-fold amount of hexane and stirred at 25° C. for 2 hours. After that, the precipitated viscous product was filtered and concentrated to obtain a white solid. 1.25-fold amount of hexane was added to the resultant white solid, and the mixture was dissolved by heating to 60° C. and recrystallized at 25° C. The NMR measurement results revealed that the resultant crystal (22 g, 76% yield) was Compound (VII).

Main materials used in the following examples

Silsesquioxane and Polymer Thereof:

Compound (II) synthesized in Synthesis Example 1

Polymer (VI) produced in Synthesis Example 2

Compound (VII) synthesized in Synthesis Example 3

Cationic Polymerization Initiator:

One manufactured by SANSHIN CHEMICAL INDUSTRY CO. LTD. (trade name: Sanaid SI-100)

Glass Fiber:

Glass cloth A: manufactured by Nitto Boseki Co., Ltd. (WEA1078), thickness: 42 µm, refractive index: 1.55

Glass cloth B: manufactured by Nitto Boseki Co., Ltd. (WTX1078), thickness: 45 µm, refractive index: 1.52

Glass cloth C: manufactured by Nitto Boseki Co., Ltd. (WTX1027), thickness: 22 µm, refractive index: 1.52

Example 1

Production of Glass Fiber-Silsesquioxane Composite Molded Article

Compound (II) (100 parts by weight) synthesized in Synthesis Example 1 and a cationic polymerization initiator (0.5 part by weight) dissolved in methyl ethyl ketone (20 parts by weight) were loaded into a container, and the container was set in a planetary centrifugal mixer (THINKY MIXER (trade name) ARE-250 manufactured by THINKY CORPORATION). The resultant was mixed and degassed to prepare a silsesquioxane-containing composition. The composition was used to impregnate a glass cloth A while preventing air bubbles from entering. After that, the resultant was degassed under vacuum for 1 hour with a vacuum dryer (DRV320DA VACUUM DRYING OVEN manufactured by ADVANTEC TOYO KAISHA, LTD.) preliminarily heated to 40° C. Then, the pressure was returned to normal pressure. After that, the resultant was cured by heating at 80° C. for 1 hour, at 120° C. for 1 hour, and then at 160° C. for 1 hour to obtain glass fiber-silsesquioxane composite molded article having a thickness of 150 µm.

Example 2

Production of Glass Fiber-Silsesquioxane Composite Molded Article

Compound (II) synthesized in Synthesis Example 1 (80 parts by weight), 1,2-dimethoxyethane (20 parts by weight), and a cationic polymerization initiator (0.5 part by weight) were loaded into a container to prepare a silsesquioxane-containing composition in the same manner as in Example 1. The composition was used to impregnate a glass cloth B while preventing air bubbles from entering. After that, the resultant was heated in the same manner as in Example 1 to obtain glass fiber-silsesquioxane composite molded article having a thickness of 85 µm.

Example 3

Production of Glass Fiber-Silsesquioxane Composite Molded Article

A glass fiber-silsesquioxane composite molded article having a thickness of 85 µm was obtained in the same manner as in Example 2 except that Compound (VII) synthesized in Synthesis Example 3 was used in place of Compound (II) obtained in Synthesis Example 1.

Example 4

Production of Glass Fiber-Silsesquioxane Composite Molded Article

Compound (II) (100 parts by weight) synthesized in Synthesis Example 1 and a cationic polymerization initiator (0.5 part by weight) were loaded into a container to prepare a silsesquioxane-containing composition in the same manner as in Example 1. A polyimide film (Kapton (registered trademark) manufactured by Ube Industries, Ltd., hereinafter, referred to as polyimide film) having a thickness of 50 µm was mounted on a flat plate made of stainless-steel and surrounded on all four sides by a spacer of 100 µm. Then, the composition was mounted on the surrounded space, and a glass cloth C was further placed thereon. This operation was repeated twice, and the surface was then covered with the composition. A polyimide film and a flat plate made of stainless-steel were laminated in the stated order thereon to sandwich the glass cloth and the composition. The whole was set in a heat pressing machine (MINI TEST PRESS-10 manufactured by Toyo Seiki Seisaku-sho, Ltd., hereinafter, referred to as pressing machine), and applied with a pressure of 1 MPa and heated at 80° C. for 1 hour, at 120° C. for 1 hour, and at 160° C. for 1 hour to obtain a molded article having a thickness of 100 µm.

Example 5

Production of Glass Fiber-Silsesquioxane Composite Molded Article

A molded article having a thickness of 100 µm was obtained in the same manner as in Example 4 except that the silsesquioxane-containing composition and the glass cloth were laminated three times.

Comparative Example 1

Production of Silsesquioxane Molded Article

A silsesquioxane molded article having a thickness of 150 μm was obtained in the same manner as in Example 1 except that no glass cloth was used.

Comparative Example 2

Production of Silsesquioxane Molded Article

A silsesquioxane molded article having a thickness of 85 μm was obtained in the same manner as in Example 3 except that no glass cloth was used.

Example 6

Production of Glass Fiber-Silsesquioxane Composite Molded Article

Polyimide films each having a thickness of 50 μm were attached to two specular finish stainless-steel plates. In one of the films, a stainless-steel plate, which has a thickness of 200 μm and is bored with a size of 3 cm×5 cm at the center, was placed on a surface on which the polyimide film was attached. 0.2 g of Polymer (VI) synthesized in Synthesis Example 2 was mounted thereon. Next, a glass cloth A cut into a piece with a size of 3 cm×5 cm was placed thereon, and 0.2 g of Polymer (VI) was further placed thereon. The glass cloth and the polymer were sandwiched with the other stainless-steel plate so that the polyimide films faced each other. The whole was set in a pressing machine, heated at 150° C. for 3 minutes, and then applied with a pressure of 5 MPa. The pressure was kept at 220° C. for 1 hour to carry out curing. Finally, cooling was performed by keeping the resultant at a pressure of 5 MPa for 5 minutes in the pressing machine set to 30° C. to obtain glass fiber-silsesquioxane composite molded article having a thickness of 200 μm.

Example 7

Production of Glass Fiber-Silsesquioxane Composite Molded Article

Compound (II) (100 parts by weight) synthesized in Synthesis Example 1 and a cationic polymerization initiator (0.5 part by weight) were loaded into a container to prepare a silsesquioxane-containing composition in the same manner as in Example 1. The composition was impregnated into a glass cloth C so as to prevent air bubbles from entering. After that, the resultant was heated at 80° C. for 15 minutes to obtain a prepreg having a thickness of 100 μm.

Example 8

Three prepregs obtained in Example 7 and a spacer measuring 100 μm were sandwiched between two stainless-steel plates and set in a pressing machine. Then, the whole was heated at 120° C. for 1 hour and at 160° C. for 1 hour while being applied with a pressure of 5 MPa to obtain a molded article having a thickness of 300 μm.

<Measurement of Total Light Transmittance and Haze>

The total light transmittance and haze of the silsesquioxane molded article obtained in each of Examples 1 to 6 and Comparative Examples 1 to 3 were measured with a haze meter (NHD 5000 manufactured by Nippon Denshoku Industries Co., Ltd.).

<Linear Expansion Coefficient and Glass Transition Temperature>

The silsesquioxane molded article obtained in each of Examples 1 to 6 and Comparative Examples 1 to 3 was cut into a piece with a width of 3 mm by a length of 15 mm. Measurement was performed using a thermomechanical analyzer (TMA-100) manufactured by Seiko Instruments Inc. at 10° C./min in the range of 30° C. to 360° C. and at a chuck-to-chuck distance of 10 mm and a load of 0.1 g. The linear expansion coefficient was calculated in the range of 50 to 100° C. The glass transition temperature was determined as the inflection point of the resultant curve, and the glass transition temperature of a silsesquioxane molded article having no clearly observed inflection point was expressed as none.

Table 1 shows the evaluation results of each sample.

TABLE 1

| Measurement items | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Glass content (%) | 18 | 43 | 40 | 28 | 40 | 16 | 0 | 0 | 0 |
| Total light transmittance (%) | 90 | 91 | 91 | 91 | 90 | 90 | 92 | 91 | 91 |
| Haze | 16 | 3 | 7 | 13 | 16 | 16 | 1 | 1 | 1 |
| Linear expansion coefficient (ppm/K) | 50 | 18 | 14 | 12 | 7 | 80 | 130 | 140 | 150 |
| Glass transition temperature (° C.) | None | None | None | None | None | 175 | 135 | 180 | 150 |

Comparative Example 3

Production of Silsesquioxane Molded Article

A silsesquioxane molded article having a thickness 200 μm was obtained in the same manner as in Example 6 except that no glass cloth A was used.

<Evaluation of Flexibility>

180° bending test was performed such that the short sides of the samples of the silsesquioxane molded articles obtained in Examples 1 to 6 and 8 and Comparative Examples 1 to 3 meets with each other. As a result, any of the samples was free of cracks, had flexibility, and was able to be bent freely.

INDUSTRIAL APPLICABILITY

The glass fiber-silsesquioxane composite molded article of the present invention can be suitably used for a substrate for a liquid crystal display device, a substrate for an organic EL display device, a substrate for a color filter, a substrate for a solar cell, a substrate for a touch panel, a substrate for a plasma display, and the like.

The invention claimed is:

1. A glass cloth-silsesquioxane composite molded article, comprising:
a glass cloth; and
a cured product of silsesquioxane polymer that forms a composite with the glass cloth,
wherein the silsesquioxane has a cage structure or partial cage structure,
wherein the glass cloth-silsesquioxane composite molded article is obtained by impregnating the glass cloth with a composition containing at least one silsesquioxane having a polymerizable functional group represented by formula (A-3), and a curing agent, or a polymerization initiator,
and subjecting the resultant to a curing reaction:

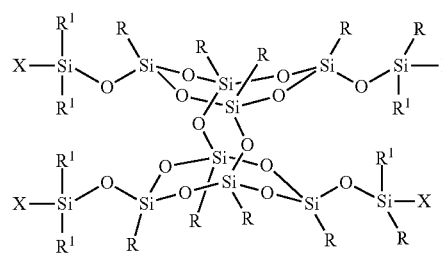

(A-3)

wherein in the formula (A-3),
R independently represents hydrogen; an alkyl having 1 to 45 carbon atoms in which any hydrogen may be substituted by fluorine and nonadjacent —$CH_2$— may be substituted by —O— or a cycloalkylene; a cycloalkyl having 4 to 8 carbon atoms; or an aryl in which any hydrogen may be substituted by an alkyl having 1 to 10 carbon atoms, halogen, or fluorine;
$R^1$ independently represents a group selected from an alkyl having 1 to 4 carbon atoms, cyclopentyl, cyclohexyl, and phenyl; and at least one of X represents an alkyl having 1 to 10 carbon atoms having a polymerizable functional group, a cycloalkyl having a polymerizable functional group, or a phenyl having a polymerizable functional group, and the remainder of X represents a group defined in the same manner as $R^1$,
wherein the polymerizable functional group of X is selected from group represented by the formulas (d) and (e)

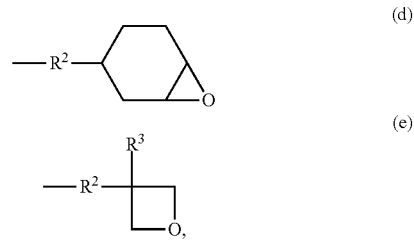

wherein, $R^2$ represents an alkylene having 1 to 10 carbon atoms, one —$CH_2$— in the alkylene may be substituted by —O— or 1,4-phenylene; and $R^3$ represents hydrogen or an alkyl having 1 to 6 carbon atoms.

2. The glass cloth-silsesquioxane composite molded article according to claim 1, wherein: the curing agent is an acid anhydride or an amine; and the polymerization initiator is a cationic polymerization initiator or a radical polymerization initiator.

3. The glass cloth-silsesquioxane composite molded article according to claim 1, wherein the glass cloth has a refractive index of 1.45 to 1.60.

4. The glass cloth-silsesquioxane composite molded article according to claim 1, wherein the glass cloth-silsesquioxane composite molded article is obtained by mixing an epoxy resin or an oxetane resin into a composition containing the compound represented by the formula (A-3) and a curing agent, or a polymerization initiator, impregnating the glass cloth with the resultant mixture, and subjecting the resultant to a curing reaction.

5. A substrate for a liquid crystal display device, comprising the glass cloth-silsesquioxane composite molded article according to claim 1.

6. A substrate for an organic EL display device, comprising the glass cloth-silsesquioxane composite molded article according to claim 1.

7. A substrate for a plasma display, comprising the glass cloth-silsesquioxane composite molded article according to claim 1.

8. A substrate for a color filter, comprising the glass cloth-silsesquioxane composite molded article according to claim 1.

9. A substrate for a solar cell, comprising the glass cloth-silsesquioxane composite molded article according to claim 1.

10. A substrate for a touch panel, comprising the glass cloth-silsesquioxane composite molded article according to claim 1.

* * * * *